United States Patent [19]

Kato et al.

[11] Patent Number: 4,930,353
[45] Date of Patent: Jun. 5, 1990

[54] SEMICONDUCTOR PRESSURE SENSOR

[75] Inventors: Yukihiro Kato; Eishi Kawasaki, both of Kariya; Masahito Mizukoshi, Nagoya, all of Japan

[73] Assignee: Nippondenso Co., Ltd., Kariya, Japan

[21] Appl. No.: 388,022

[22] Filed: Jul. 31, 1989

[30] Foreign Application Priority Data

Aug. 7, 1988 [JP] Japan .................. 63-197572
Jun. 21, 1989 [JP] Japan .................. 1-158715

[51] Int. Cl.$^5$ ................... G01L 7/08; G01L 9/06
[52] U.S. Cl. ........................... 73/727; 338/4; 374/143
[58] Field of Search ............... 73/720, 721, 726, 727, 73/DIG. 4, 714, 754; 338/4, 42; 374/143

[56] References Cited

U.S. PATENT DOCUMENTS

| 4,320,664 | 3/1982 | Rehn et al. | 73/708 |
| 4,574,640 | 3/1986 | Krechmery | 73/721 |

FOREIGN PATENT DOCUMENTS

| 55-128131 | 10/1980 | Japan . | |
| 58-63826 | 4/1983 | Japan . | |
| 61-11625 | 1/1986 | Japan . | |
| 61-175537 | 8/1986 | Japan . | |
| 62-267635 | 11/1987 | Japan . | |
| 62-291534 | 12/1987 | Japan . | |
| 62-293131 | 12/1987 | Japan . | |
| 0679835 | 8/1979 | U.S.S.R. | 73/726 |
| 0960559 | 9/1982 | U.S.S.R. | 73/720 |
| 5863826A | 4/1983 | United Kingdom . | |
| 6111625A | 1/1986 | United Kingdom . | |

OTHER PUBLICATIONS

Pressure/Temperature Sensor #870287-1987 SAE.

Primary Examiner—Donald O. Woodiel
Attorney, Agent, or Firm—Cushman, Darby & Cushman

[57] ABSTRACT

In an improved semiconductor pressure sensor adapted to detect a pressure of a measured medium such as a refrigerant used in a refrigerating cycle for an automobile, there are provided a sensing portion composed of a glass support plate and a silicon substrate disposed thereon and provided with a diaphragm portion displaceable in accordance to a pressure of the measured medium at such a position of the silicon substrate as to be brought into contact with the measured medium, a detecting means disposed within the sensing portion so as to detect a displacement of the diaphragm portion, a housing having an interior space including an accommodation portion for accommodating the sensing portion and having at least a predetermined portion of the accommodation portion made up of metal as opposed to the sensing portion, and a solder glass provided between the predetermined portion of the housing and a predetermined portion of the sensing portion so as to hermetically seal the interior space of the housing with respect to said measured medium. In another aspect of the invention, the housing holds the sensing portion in such a projecting manner as to enable the diaphragm portion to be put into the flow of the measured medium.

19 Claims, 10 Drawing Sheets

PRESSURE

SEMICONDUCTOR PRESSURE SENSOR

BACKGROUND OF THE INVENTION

1. Field of the Invention

The present invention relates to a semiconductor pressure sensor for detecting a pressure of a medium to be measured.

2. Description of the Prior Art

As a device for detecting a pressure of a medium to be measured there has been known a diaphragm type pressure transducer which makes use of a characteristic of a semiconductor which changes its resistance in accordance to an intensity of a pressure as disclosed in Japanese Laid Open Patent Publication No. 1983-63826. There are, however, a number of disadvantages associated with such a transducer. That is, when the diaphragm type pressure transducer is employed for a high pressure medium to be measured, a diaphragm portion is subjected to a high pressure and suffers its peeling off from a support plate and also a damage.

Figure 14:
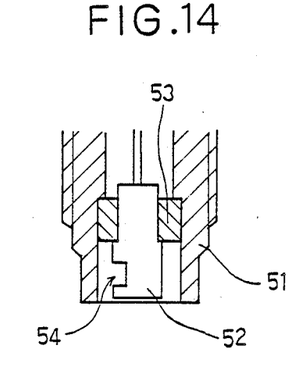
FIG. 14 is a sectional view showing a conventional semiconductor pressure sensor.

As an improved one for measuring such a high pressure medium, it is known that a pressure sensor disclosed in Japanese Laid Open Patent Publication No. 1987-293131 is available. As shown in FIG. 14, the pressure sensor is provided with a stick-like sensing portion 52 disposed in a cylindrical metal housing 51 and a sealing plate 53 which seals between the sensing portion 52 and the cylindrical housing 51. The sensing portion 52 is provided at its leading end part with a diaphragm portion 54 for detecting a pressure. But, the sensor is disadvantageous in the unpractical construction because the sensing portion 52 is made up of a ceramic material against a recent trendy in which a sensing portion of a pressure sensor is made up of silicon and glass. Even though the sensing portion made us of silicon and glass is employed instead of the sensing portion 52 made up of the ceramic material. It is difficult to keep an airtight condition between the metal housing and the sensing portion made up of silicon and glass.

SUMMARY OF THE INVENTION

The present invention is directed to solving the above-mentioned problems and has for its object to provide a semiconductor pressure sensor which has a sensing portion provided with a diaphragm portion and made up of silicon and glass and enables to keep and airtight condition between the sensing portion and a metal portion of a housing thereof.

For accomplishing the above-mentioned object, the present invention resides in a semiconductor pressure sensor which comprising:

a sensing portion composed of a glass support plate and a silicon substrate disposed thereon and provided with a diaphragm portion displaceable in accordance to a pressure of a measured medium at such a position of the silicon substrate as to be brought into contact with said measured medium;

a detecting means disposed within said sensing portion so as to detect a displacement of said diaphragm portion;

a housing having an interior space including an accommodation portion for accommodating said sensing portion and having at least a predetermined portion of said accommodation portion made up of metal as opposed to said sensing portion; and a solder glass provided between said predetermined portion of said housing and a predetermined portion of said sensing portion so as to hermetically seal the interior space of said housing with respect to said measured medium.

The above and other objects and advantages of the present invention will become more apparent from the following description of the invention with reference to the attached drawings.

DETAILED DESCRIPTION OF THE PREFERRED EMBODIMENTS

Now the present invention will be explained with reference to the drawings hereinafter.

Figure 1:
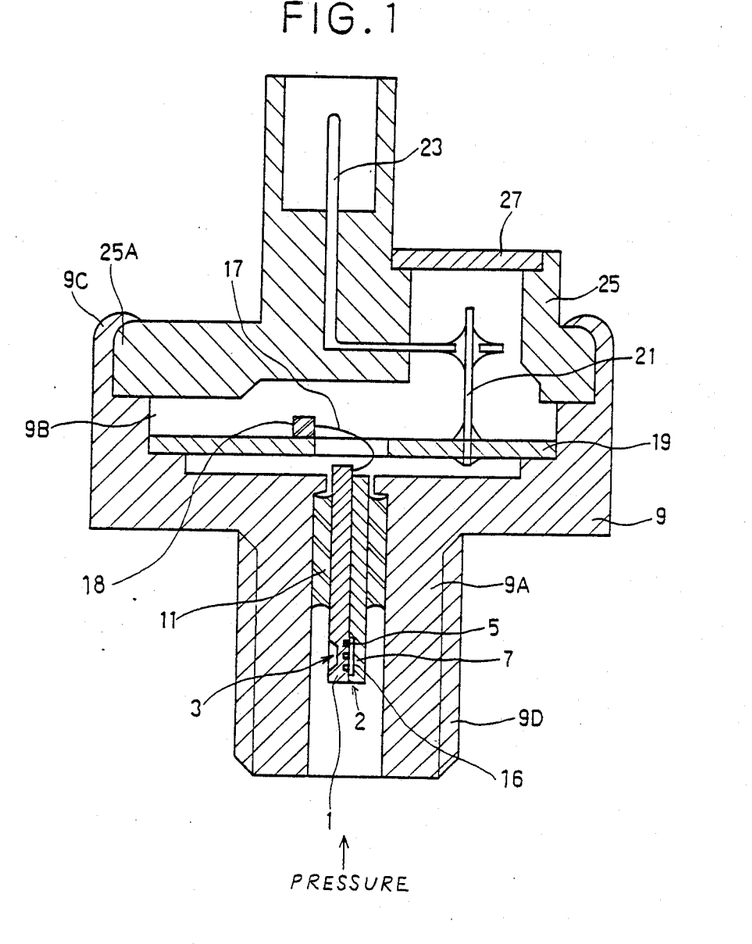
FIG. 1 is a sectional view showing a general construction of a semiconductor pressure sensor as one embodiment of the present invention.
Figure 2:
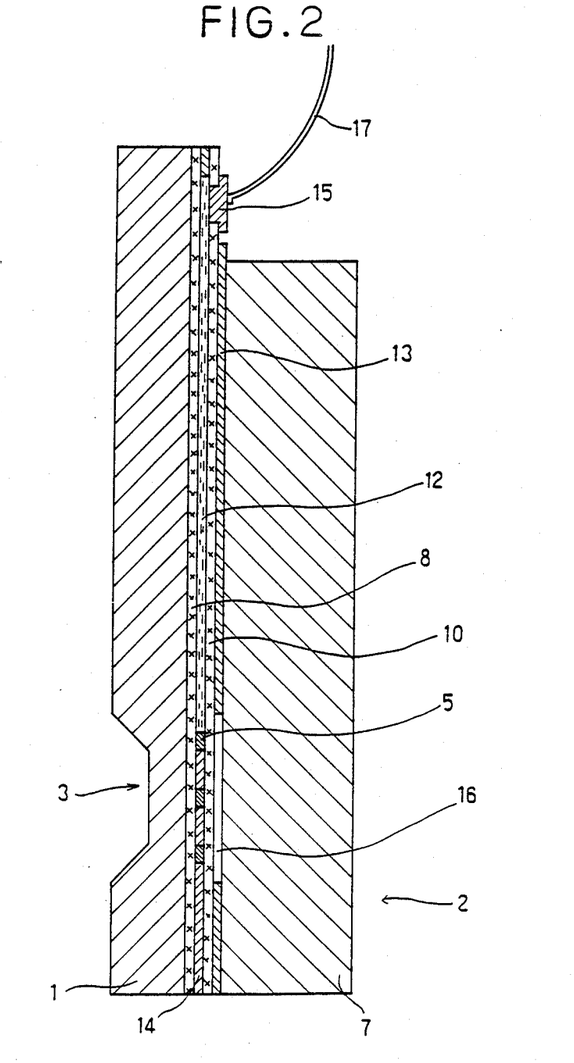
FIG. 2 is a sectional view of a principal portion of the embodiment shown in FIG. 1.

FIG. 1 is a schematic sectional view showing the first embodiment of the present invention, and FIG. 2 is a sectional view of a principal portion of the first embodiment thereof. The first embodiment of the present invention will be explained with reference to FIGS. 1 and 2. In FIG. 1, symbol 1 designates a single crystal silicon (Si) substrate which is provided with a diaphragm portion 3 and a strain gauge 5 and is joined with a support plate 7 made of glass having a characteristic similar to the coefficient of thermal expansion of the single crystal silicon substrate 1 like borosilicate glass (name used in trade : Pyrex-glass) so as to sandwich the opposite sides of the strain gauge 5 therebetween, to form a stick-like sensing portion 2 having a square cross section and to have a facedown construction. Symbol 9 designates a housing made of metal such as a Fe-Ni-Co system alloy(name used in trade : Kovar) or a Ni-Fe system alloy(name used in trade 42-alloy). The sensing portion 2 is fixedly secured within a cylindrical portion 9A, which is formed in the housing 9 as a reception portion for introducing a measured pressure medium, by means of solder glass 11 so as to provide an airtight seal (called a hermetic seal) between the outer circumferential surface of the sensing portion 2 and the inner circumferential surface of the cylindrical portion 9A. Symbol 17 designates a bonding wire led out of the substrate 1, which serves to transmit an electric signal generated in the strain gauge 5 within the substrate 1 to a substrate 19 provided with an amplifier circuit (a hybrid IC in this embodiment) through a chip terminal 18 made of aluminum. This substrate 19 is accommodated within a chamber portion 9B formed in the upper end of the housing 9, and an electric signal amplified by the amplifier circuit therein is output outside the sensor through a pin 21 and a terminal 23 disposed in a connector area. A connector case 25 is made of resin and is fixedly secured at the outer circumferential surface 25A of its bottom portion to the housing 9 by means of a caulked portion 9C formed in the upper end of the housing 9. A resin lid 27 is fixedly bonded to the connector case 25. The pin 21 and the terminal 23 are connected each other by means of soldering. The substrate 19 is fixedly bonded within the chamber portion 9B of the housing 9. Symbol 9D designates a threaded portion which is used to be threadably secured to a housing on a measured side.

FIG. 2 is a sectional view of the principal portion (the sensing portion 2) of the first embodiment. Symbol 8 and 10 designate $SiO_2$ layers, symbol 12 designates a low resistivity Poly-Si layer which provides a conductive portion for electrically connecting the strain gauge 5 to an Al land 15, symbol 13 does a high resistivity Poly-Si layer for joining the glass support plate 7 and the Si substrate 1 each other, symbol 14 does a high resistivity Poly-Si layer for use in insulation, symbol 15 does the Al land, symbol 16 does a vacuum chamber as a reference pressure chamber formed by etching the high resistivity Poly-Si layer 13, and symbol 17 does the bonding wire.

Then, the hermetically seal formed of the above-mentioned solder glass 11 will be explained.

This embodiment is particularly tasked to provide a method how both the Si substrate 1 and the glass support plate 7 forming the sensing portion 2 are joined with the metal housing 9 through the hermetic seal. After various investigations about this task, by paying attention to the coefficient of thermal expansion of Si being $31 \times 10^{-7}/°C$. and the coefficient of thermal expansion of the Pyrex glass used as the glass for the support plate 7 being $32.5 \times 10^{-7}/°C$. the housing 9 is made up of the Kovar(the coefficient of thermal expansion $52-54 \times 10^{-7}/°C$.) having a good conformity to the coefficient of thermal expansion of the sensing portion 2 or the 42-alloy (the coefficient of thermal expansion being similar to that of the Kovar) and a solder glass is employed for providing the hermetic seal therebetween. However, in case that the coefficients of thermal expansion of the sensing portion 2, of the solder glass 11 and of the housing 9 are mismatched, the sensing portion 2 is subjected to an excessive stress which causes a breakage of the sensing portion 2.

Figure 3:
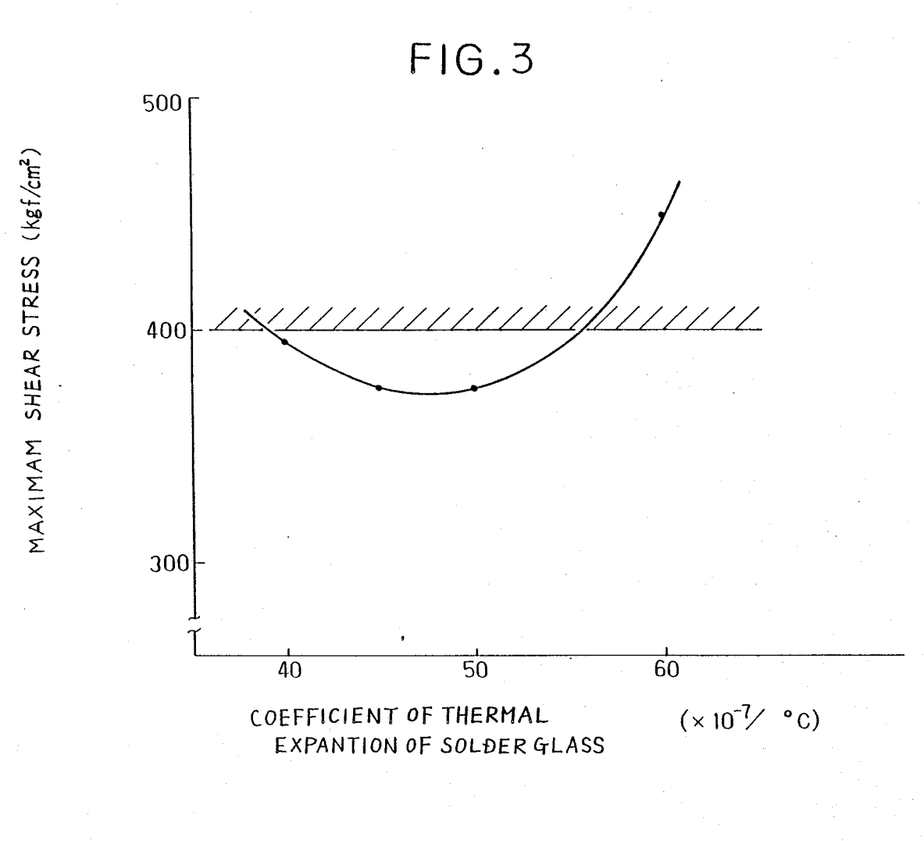
FIG. 3 is a diagram showing the relation between the coefficient of thermal expansion and the maximum shear stress of a solder glass.

In relation to that, in the case that the housing 9 is made up of the Kovar and the glass support plate 7 is made up of the Pyrex-glass, a stress analysis about a maximum shear stress of the solder glass 11 by the FEM (the finite element method) provides the result as shown in FIG. 3. According to this analysis result, the coefficient of the solder glass 11 is required to be ab. $40-50 \times 10^{-7}/°C$. because the breaking strength of the Pyrex-glass is 400 Kg. f/cm$^2$. Therefore, this embodiment employs the value of, for example $41 \times 10^{-7}/°C$. as the coefficient of thermal expansion thereof.

Then, the operation of the first embodiment will be explained. When the sensing portion 2 is put into the measured pressure medium, a pressure of the medium is applied to the diaphragm portion 3. Thereupon, the diaphragm portion 3 is displaced so that a stress depending on this displacement is applied to the strain gauge 5 to generate an electric signal according to the pressure. The electric signal is output to the amplifier circuit mounted on the substrate 19, through the low resistivity Poly-Si layer 12, the Al land 15 and the bonding wire 17. The electric signal amplified by the amplifier circuit is adapted to be output to an unillustrated outer device (for example a computer) through the pin 21 and the terminal 23.

As explained above, according to the first embodiment, since the sensing portion 2 including the strain gauge 5 and the diaphragm portion 3 is fixedly secured to the housing 9 by means of the solder glass 11 so that the portion (Al land 15) provided on the sensing portion 2 for taking out the electric signal is isolated from the pressure, it is possible to give a sufficient length to the airtight sealing portion made of the solder glass 11 with respect to the cylindrical portion 9A of the housing 9 and to remarkable improve the sealing capability between the measured medium side and the chamber portion 9B side. Further, since the airtight sealing portion for isolating the electric signal taking out portion from the pressure medium is made up of the solder glass 11, it is applicable to almost kinds of pressure medium and to such a portion as to be needed to have a high airtightness. If the diaphragm portion including the strain gauge 5 and so on should be broken, advantageously the pressure medium is prevented from leaking to the electric signal taking out side (where the Al land 15 and the bonding wire 17 are disposed) because the sensing portion itself serves as a sealing member. Further, it may be possible to mount the amplifier and so on on the Si substrate 1 instead of on the substrate 19 so as to be integrated as one chip IC.

Figure 4:
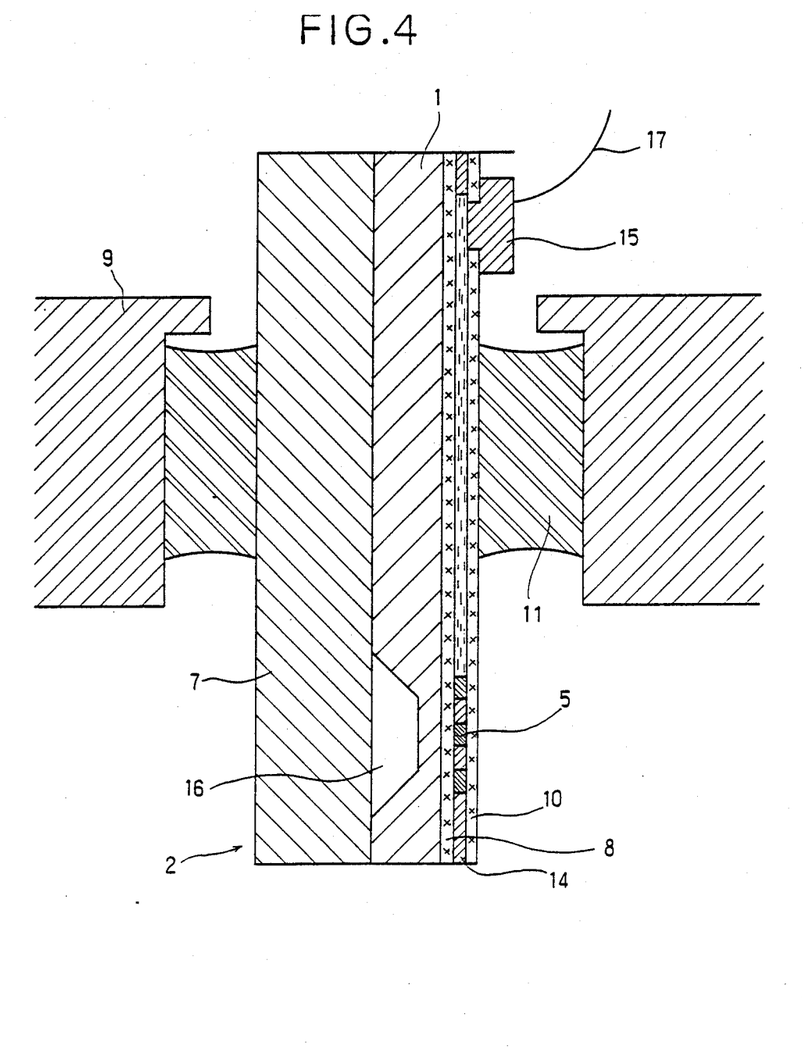
FIG. 4 is a sectional view of a principal portion showing another embodiment of the present invention.

Incidentally, instead of the facedown construction of this embodiment in which the Si substrate 1 is joined on its strain gauge side to the glass support seat 7, as shown in FIG. 4, it may be joined thereto on its other side opposed to the strain gauge side.

Figure 5:
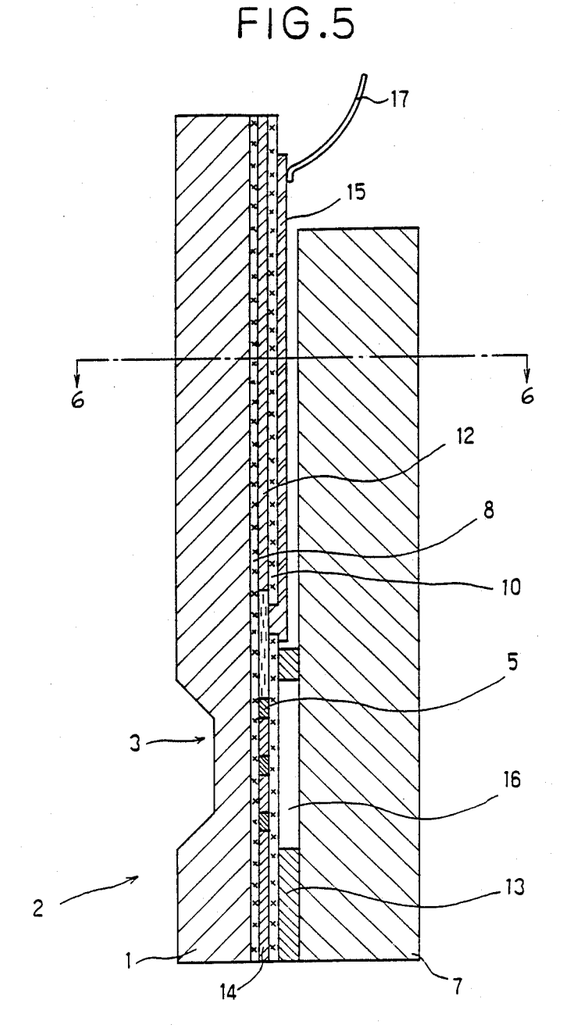
FIG. 5 is a sectional view of a principal portion showing further another embodiment of the present invention.
Figure 6:
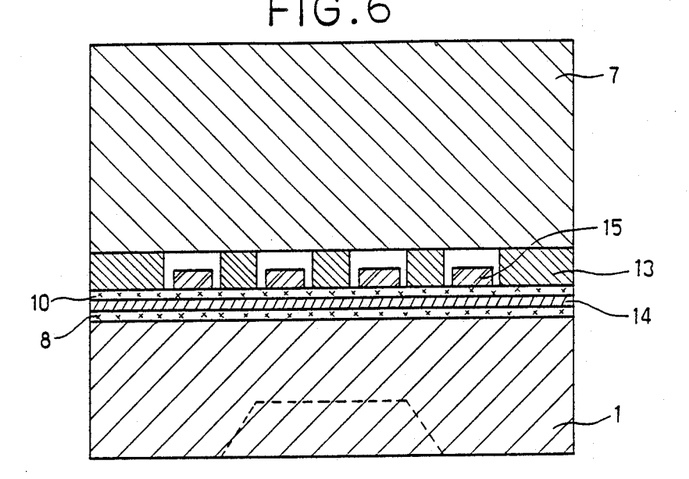
FIG. 6 is a sectional view on A-A line in FIG. 5.
Figure 7:
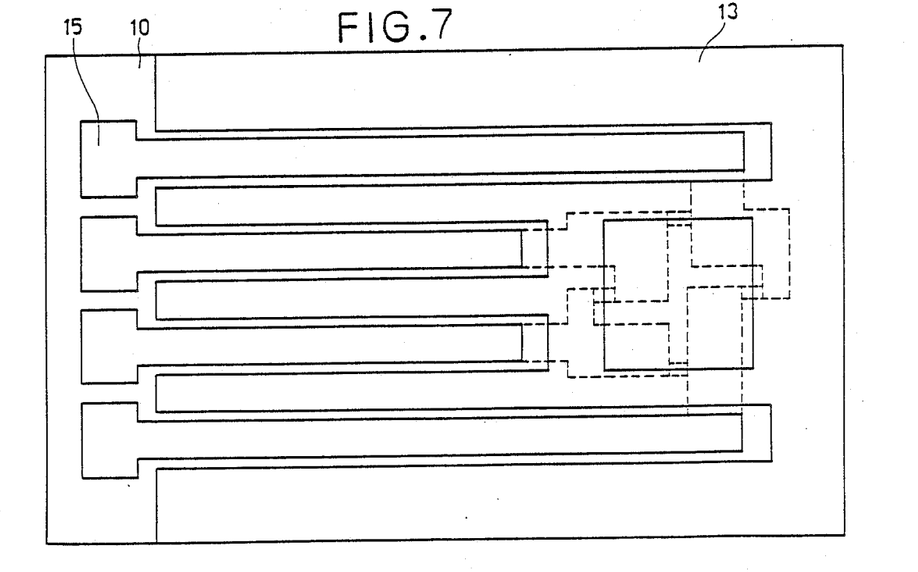
FIG. 7 is a plan view of a sensing portion of the embodiment shown in FIG. 5.

Further, instead of the electrical connection according to this embodiment in which the strain gauge 5 is electrically connected to the Al land 15 as an electric signal output means and to the bonding wire 17 through the low resistivity Poly-Si layer 12 as shown in FIG. 2, the strain gauge 5 may be electrically connected thereto through any other conductive member besides the low resistivity Poly-Si layer. For example as shown in FIG. 5, when the vacuum chamber 16 is formed by etching the high resistivity Poly-Si layer 13, simultaneously a channel is formed by means of etching a metal film. Then, a contact hole is formed by etching a predetermined position of the $SiO_2$ layer and a metal film 15 is formed of Al and the like in the channel thinlyer than the high resistivity Poly-Si layer 13. The bonding wire 17 is connected to the metal film 15. In that way, by using the low resistivity metal film 15, it becomes possible to prevent a lowering of the sensitivity which might be caused by a loss of applied voltage. FIG. 6 is a sectional view on A-A line in FIG. 5, and FIG. 7 is a plan view of a principal portion with out the support plate 7 in FIG. 5.

Figure 8:
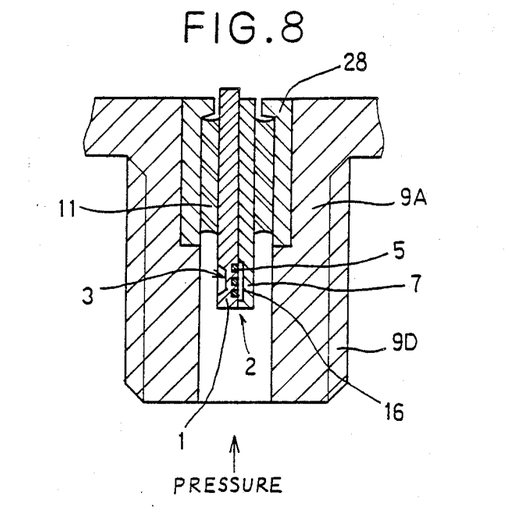
FIG. 8 is a partial sectional view showing a still further another embodiment of the present invention.

Further, instead of the housing 9 the whole of which is made up of the Kovar or the 42-alloy, as shown in FIG. 8, the housing 9 may have such a constitution that only its portion brought into contact with the solder glass 11 is provided with a collar 28 made of the Kovar or the 42-alloy and its other portion is made of steel (for example carbon steel).

Figure 9:
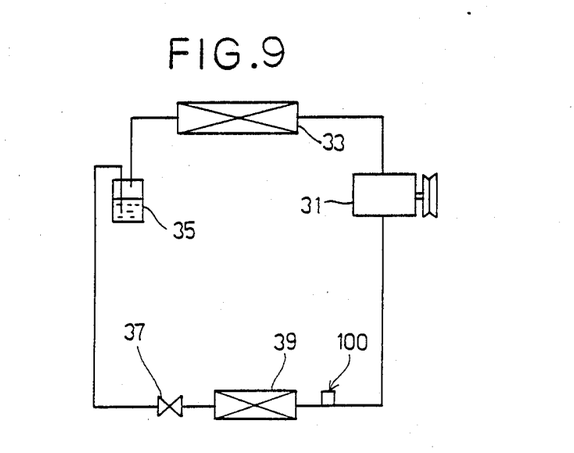
FIG. 9 is a schematic view showing a construction of a refrigerating cycle for and automobile to which the present invention is applied.

Next, will be explained the embodiment in which the present invention is applied to a refrigerating cycle for an automobile air conditioner. Symbol 31 designates a compressor, symbol 33 does a condenser, symbol 35 does a receiver, symbol 37 does an expansion valve, and symbol 39 does an evaporator. Inthis refrigerating cycle, a semiconductor pressure sensor 100 according to this refrigerating cycle apparatus is disposed in a refrigerant pipe on the low pressure side between the evaporator 39 and the compressor 31 so as to detect both a pressure and a temperature of the refrigerant. Besides, the semiconductor pressure sensor 100 may be disposed in a refrigerant pipe on the high pressure side between the receiver 35 and the expansion valve 37 as required for control.

Figure 10:
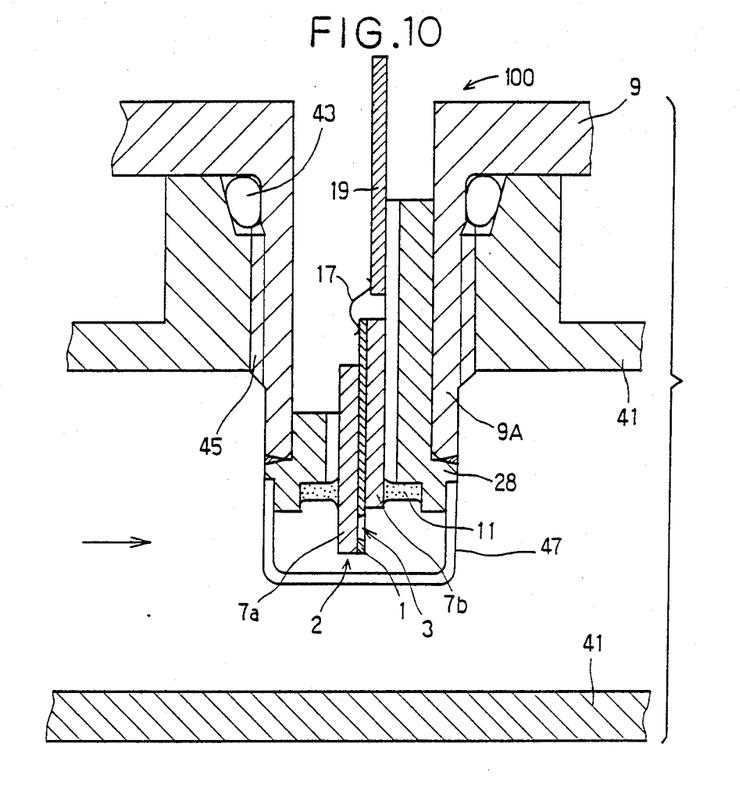
FIG. 10 is a partial sectional view of a semiconductor pressure sensor of the embodiment shown in FIG. 9.

FIG. 10 is a partial sectional view of the semiconductor pressure sensor 100 attached to the refrigerant pipe 41. The semiconductor pressure sensor 100 is fixedly secured to the refrigerant pipe 41 by attaching its housing 9 to the refrigerant pipe 41 through an 0-ring 43 by means of a screw 45 thereof. The sensing portion 2 of the semiconductor pressure sensor 100 has such a constitution as for the Si substrate 1 to be sandwiched between two support plates 7a, 7b made of the Pyrex-glass. Between the sensing portion 2 and the cylindrical collar 28 (a portion of the housing 9) made of the Kovar fitted to the inner circumferential surface of the cylindrical portion 9A of the housing 9 there is provided a hermetic seal made of the solder glass 11. The sensing portion 2 is projected from the leading portion of the collar 28 so that the pressure and the temperature of the refrigerant can be measured directly. The collar 28 is provided with a wire netting 47 for protecting the sensing portion 2. Therefore, the sensing portion 2 detects the pressure and the temperature of the refrigerant through the wire netting 47. The diaphragm portion 3 is located on such a side of the Si substrate 1 of the sensing portion 2 as not to be influenced by a dynamic pressure of the flow of the refrigerant indicated by the directed line in FIG. 10 with respect to the refrigerant flow. Accordingly, since the diaphragm portion 3 of the sensing portion 2 is directly brought into contact with the refrigerant passed through the wire netting 47 and is located at such a position as to be not influenced by the dynamic pressure of the refrigerant, it is possible to detect the pressure of the refrigerant correctly. Further, since the sensing portion 2 is projected from the housing 9 and the collar 28, it is possible to detect the temperature of the refrigerant without being influenced by a heat conduction from the housing 9 and the collar 28.

Figure 11:
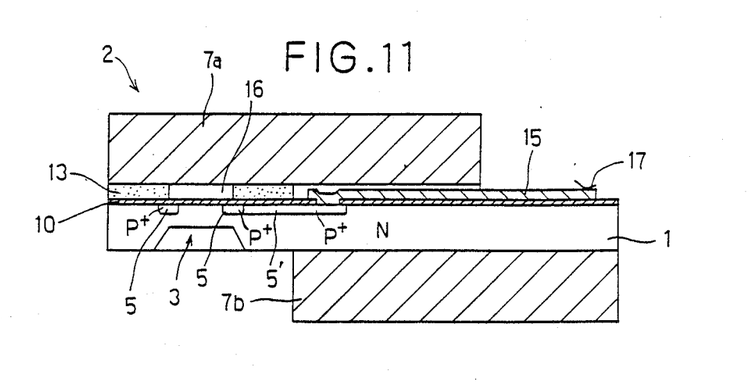
FIG. 11 is a sectional view showing a sensing portion of the semiconductor pressure sensor shown in FIG. 10.

FIG. 11 is a sectional view of the sensing portion 2. As shown in FIG. 11, between the Si substrate 1 and the support plate 7a made of the Pyrex-glass there is provided the vacuum chamber 16 formed by the joint Poly-Si layer 13 between the Pyrex-glass plate 7a and the $SiO_2$ layer 10 formed on the Si substrate 1 as an insulator membrane similarly to that shown in FIG. 5. The Si substrate 1 is provided on its one side with the diaphragm portion 3 and on its other side with the strain gauge 5 (composed of four strain gauges 5a–5d provided in a circuit described later). The strain gauge 5 is connected to an aluminum electrode 15 through a diffusion lead 5'.

Further, will be explained a circuit for detecting the pressure and the temperature of the refrigerant by means of the semiconductor pressure sensor 100.

Figure 12:
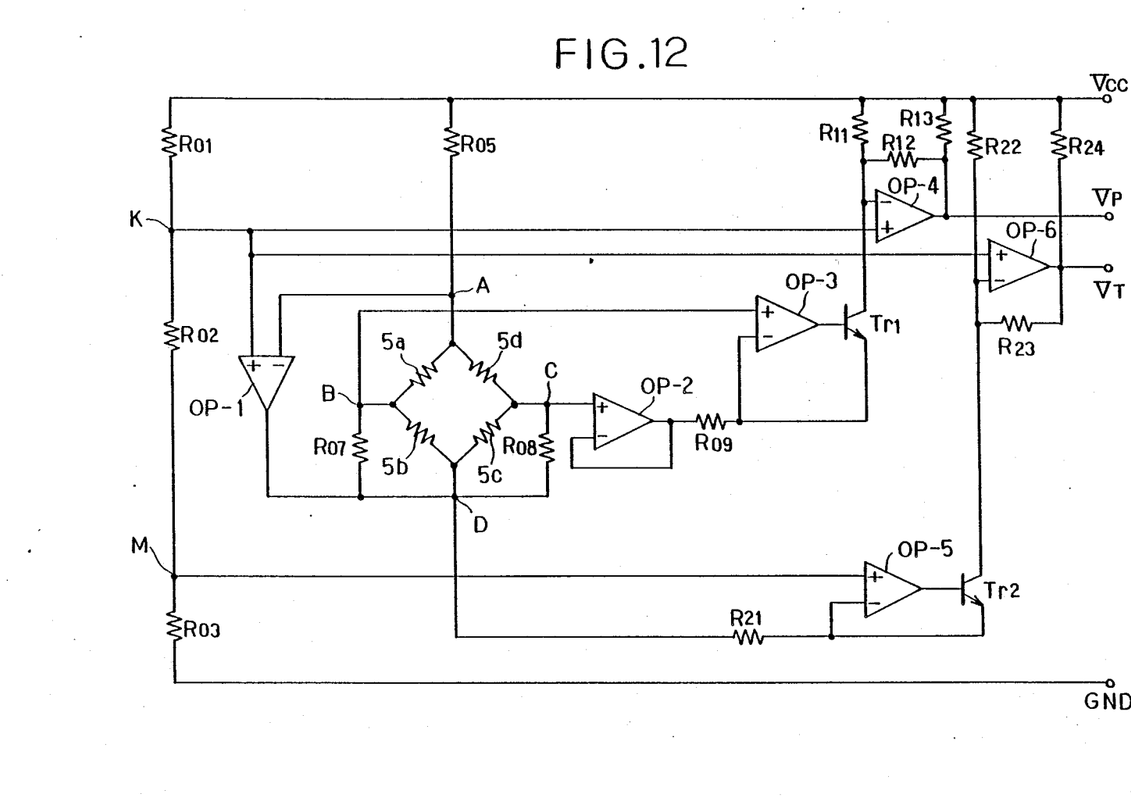
FIG. 12 is a circuit diagram showing a circuit for detecting a pressure and a temperature of a refrigerant by means of the semiconductor pressure sensor shown in FIG. 10.

FIG. 12 is a circuit diagram of the circuit. In FIG. 12, the strain gauges 5a–5d are arranged so that the respective resistance values thereof change according to the pressure condition of the refrigerant acting on the sensing portion 2 shown in FIG. 10 and simultaneously are variable according to the temperature of the sensing portion 2, One pair of strain gauges 5b, 5d arranged diagonally each other are adapted to increase their resistance values according to the pressure, and the other pair of strain gauges 5a, 5c arranged diagonally each other are adapted to decrease their resistance values according to the pressure. As a result, the resistance value between both points of A and D is independent of the pressure.

Between a power source $V_{cc}$ and an earthing point GND there is provided a series circuit comprising resistors R01, R02 and R03. Respective constant-potentials $V_k$, $V_M$ at the connection points K, M between the resistors R01, R02 and between the resistors R02, R03 are settled by a divided voltage. The power source $V_{cc}$ is connected to the point A as the connection point between the strain gauges 5a and 5d of the Wheatstone bridge through a resistor R05. The potential together with the potential at the point K. The output from the operation amplifier OP-1 is supplied to the connection point B between the strain gauges 5a and 5d and to the connection point between the strain gauges 5c and 5d respectively through the respective resistors R07, R08. That is, the operation amplifier OP-1 and the resistor R05 serve as a constant current source for the bridge circuit comprising the strain gauges, and the resistors R07 and R08 provide a circuit to roughly adjust an offset output voltage of the bridge circuit.

The output voltage $V_c$ at the output point C of the Wheatstone bridge comprising the strain gauges is supplied to an operation amplifier OP-2. The operation amplifier OP-2 is provided for preventing circuit side current from flowing into the bridge circuit or from flowing reversely. The output signal from this operation amplifier OP-2 is supplied to an operation amplifier OP-3 together with the output voltage $V_c$ from the point B of the bridge circuit through a resistor R09. Then, a transistor $Tr_1$ is controlled by the output from the operation amplifier OP-3. These operation amplifier OP-3, resistor R09 and transistor $Tr_1$ serve to convert an output voltage "$V_{B-VC}$" of the Wheatstone bridge to a current output.

Since the transistor $Tr_1$ controlled by the output signal from the operation amplifier OP-3 is connected at its collector to the power source $V_{CC}$ through a resistor R11, the signal in the collector circuit of the transistor $Tr_1$ is supplied to an operation amplifier OP-4. The operation amplifier OP-4 forms an amplifier circuit together with resistors R11, R12, R13 so as to amplify the current output from the operation amplifier OP-3 and to obtain a pressure detection signal $V_p$. Thereupon, the amplification factor of the circuit by the operation amplifier OP-4 is defined according to the ratio between the resistor R12 and the resistor R09.

A signal $V_D$ at a point D as the connection point between the strain gauges 5b and 5c is supplied to an operation amplifier OP-5 together with a reference voltage $V_M$ settled at a point M. The operation amplifier OP-5 detects a change of the voltage $V_D$ adapted to change according to a temperature at the point D together with a resistor 21 so as to convert the change to a current output and to control a transistor $Tr_2$ by an output signal from the operation amplifier OP-5. A signal in the collector circuit of the transistor $Tr_2$ is supplied to an operation amplifier OP-6 together with the reference voltage $V_K$ at a point K. The operation amplifier OP-6 comprises an amplifier circuit together with resistors R22, R23, R24 and serves to amplify the output signal from the operation amplifier OP-5 and to obtain a temperature detection output $V_T$.

Figure 13:
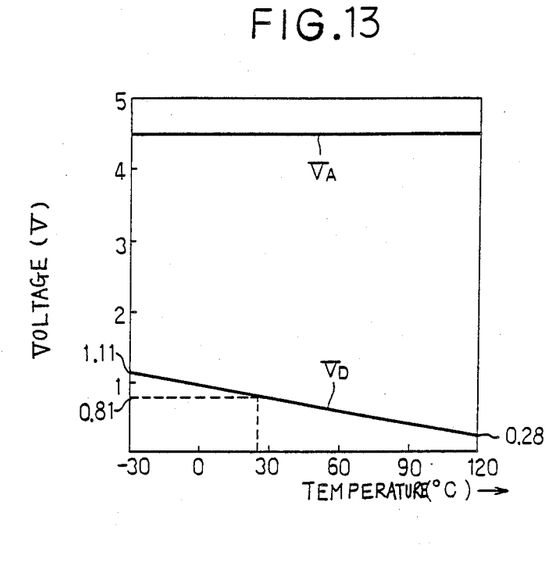
FIG. 13 is a characteristic diagram showing an output condition of a temperature detecting terminal portion in the circuit shown in FIG. 12.

Accordingly, in case that the pressure acting on the sensing portion 2 changes, the potential $V_C$ at the output point C of the Wheatstone bridge comprising the strain gauges changes according to this pressure change so as to output the pressure detection signal $V_P$. Since the potential $V_D$ at the point D changes linearly with respect to the temperature as shown in FIG. 13, the temperature detection signal $V_T$ can be obtained by using the circuit of the operation amplifier OP-5 as a circuit for converting the potential $V_D$ at the point D to such a signal as to change nearly from an earthing voltage (GND) to a power source potential ($V_{CC}$).

Incidentally, instead of the above-mentioned embodiment in which the pressure and the temperature of the pressure medium are adapted to be detected by use of the strain gauges 5a–5d, a temperature detection element may be arranged near the strain gauges 5a–5d on the Si substrate 1 so as to detect the temperature of the medium thereby.

What is claimed is:

1. A semiconductor pressure sensor adapted to detect a pressure of a measured medium, which comprising in combination;
    a sensing portion composed of a glass support plate and a silicon substrate disposed thereon and provided with a diaphragm portion displaceable in accordance to a pressure of a measured medium at such a position of the silicon substrate as to be brought into contact with said measured medium;
    a detecting means disposed within said sensing portion so as to detect a displacement of said diaphragm portion;
    a housing having an interior space including an accommodation portion for accommodating said sensing portion and having at least a predetermined portion of said accommodation portion made up of metal as opposed to said sensing portion; and
    a solder glass provided between said predetermined portion of said housing and a predetermined portion of said sensing portion so as to hermetically seal the interior space of said housing with respect to said measured medium.

2. A semiconductor pressure sensor according to claim 1, wherein the coefficient of thermal expansion of said metal portion of said housing is similar to the coefficients of thermal expansion of said silicon substrate and of said glass support plate, and the coefficient of said solder glass has an intermediate value between both the coefficients of thermal expansion of said glass support plate and of said metal portion.

3. A semiconductor pressure sensor according to claim 2, wherein, said metal portion of said housing is made up of Fe-Ni-Co system alloy, and the glass for said support plate is borosilicate glass.

4. A semiconductor pressure sensor according to claim 2, wherein said metal portion of said housing is made up of Ni-Fe system alloy, and the glass for said support plate is borosilicate glass.

5. A semiconductor pressure sensor according to claim 1, wherein, said predetermined portion of said housing is provided with a metal collar.

6. A semiconductor pressure sensor according to claim 1, wherein, said detecting means includes a strain gauge disposed at the position opposed to said diaphragm portion within said silicon substrate.

7. A semiconductor pressure sensor adapted to detect a pressure of a measured medium, which comprising in combination;
    a sensing portion composed of a glass support plate and a silicon substrate disposed thereon and provided with a diaphragm portion displaceable in accordance to a pressure of a measured medium at such a position of the silicon substrate as to be brought into contact said measured medium;
    a detecting means disposed within said sensing portion so as to detect a displacement of said diaphragm portion;
    a housing having an interior space including an accommodation portion for accommodating said sensing portion, having at least a predetermined portion of said accommodation portion made up of metal as opposed to said sensing portion, and holding said sensing portion in such a projecting manner as to enable said diaphragm portion of said sensing portion to be put into the flow passage of said measured medium; and
    a solder glass provided between said predetermined portion of said housing and a predetermined portion of said sensing portion so as to hermetically seal the interior space of said housing with respect to said measured medium.

8. A semiconductor pressure sensor according to claim 7, wherein, the coefficient of thermal expansion of said metal portion of said housing is similar to the coefficients of thermal expansion of said silicon substrate and of said glass support plate, and the coefficient of thermal expansion of said solder glass has an intermediated value between both the coefficients of thermal expansion of said glass support plate and of said metal portion.

9. A semiconductor pressure sensor according to claim 8, wherein, said metal portion of said housing is made up of Fe-Ni-Co system alloy, and the glass for said support plate is borosilicate glass.

10. A semiconductor pressure sensor according to claim 8, wherein said metal portion of said housing is made up of Ni-Fe system alloy, and the glass for said support plate is borosilicate glass.

11. A semiconductor pressure sensor according to claim 7, wherein, said predetermined portion of said housing is provided with a metal collar.

12. A semiconductor pressure sensor according to claim 7, wherein, said diaphragm portion is provided at such a position in said sensing portion as to be not influenced by a dynamic pressure of said measured medium.

13. A semiconductor pressure sensor according to claim 7, wherein, said detecting means includes a strain gauge disposed at the position opposed to said diaphragm portion within said silicon substrate.

14. A semiconductor pressure sensor according to claim 7, wherein, said detecting means includes a temperature detecting means for detecting a temperature of said measured medium at the projected portion of said sensing portion.

15. A semiconductor pressure sensor according to claim 7, wherein, said semiconductor pressure sensor further comprising:
a protection cap provided in said housing so as to permit said measure medium to pass therethrough and to protect the projected portion of said sensing portion.

16. A semiconductor pressure sensor adapted to detect a refrigerant pressure within a refrigerant pipe employed in a refrigerating cycle for an automobile including an evaporator, a compressor, a condenser, a receiver, an expansion valve and a refrigerant pipe connecting them, which comprising in combination;
a sensing portion composed of a glass support plate and a silicon substrate disposed thereon and provided with an diaphragm portion displaceable in accordance to a pressure of said refrigerant at such a position of the silicon substrate as to be brought into contact with said refrigerant;
a detecting means disposed within said sensing portion so as to detect a displacement of said diaphragm portion;
a housing having an interior space including an accommodation portion for accommodating said sensing portion, having at least a predetermined portion of said accommodation portion made up of metal as opposed to said sensing portion and holding said sensing portion in such a projecting manner as to enable said diaphragm portion of said sensing portion to be put into the flow passage of said refrigerant; and
a solder glass provided between said predetermined portion of said housing and a predetermined portion of said sensing portion so as to hermetically seal the interior space of said housing with respect to said refrigerant.

17. A semiconductor pressure sensor according to claim 16, wherein said sensing portion has such a constitution that said silicon substrate is sandwiched between said pair of glass support plates at least at its portion to be hermetically sealed by said solder glass, that the portion projected into said refrigerant is composed of said silicon substrate and one of said paired glass support plates and that the portion of said silicon substrate provided with said diaphragm is exposed to said refrigerant.

18. A semiconductor pressure sensor according to claim 16, wherein said detecting means includes a temperature detecting means for detecting the temperature of said refrigerant at the projected portion of said sensing portion.

19. A semiconductor pressure sensor according to claim 17, wherein said semiconductor pressure sensor further comprising:
a protection cap provided in said housing so as to permit said measure medium to pass therethrough and to protect the projected portion of said sensing portion.

* * * * *